United States Patent [19]

Nobuta

[11] Patent Number: 5,153,744
[45] Date of Patent: Oct. 6, 1992

[54] IMAGE COMMUNICATION APPARATUS AND IMAGE DATABASE SYSTEM USING THE SAME

[75] Inventor: Hiroshi Nobuta, Yokohama, Japan

[73] Assignee: Canon Kabushiki Kaisha, Tokyo, Japan

[21] Appl. No.: 561,070

[22] Filed: Aug. 1, 1990

[30] Foreign Application Priority Data

Aug. 2, 1989 [JP] Japan .................. 1-199347

[51] Int. Cl.⁵ ............................................. H04N 1/00
[52] U.S. Cl. .............................. 358/400; 358/403
[58] Field of Search ................................. 358/400–407

[56] References Cited

U.S. PATENT DOCUMENTS

| | | | |
|---|---|---|---|
| 4,785,355 | 11/1988 | Matsumoto | 358/257 |
| 4,893,333 | 1/1990 | Baran et al. | 379/100 |
| 4,918,722 | 4/1990 | Duehren et al. | 358/407 |
| 4,994,926 | 2/1991 | Gordon et al. | 358/400 |
| 5,016,114 | 5/1991 | Sakata et al. | 358/401 |
| 5,065,254 | 11/1991 | Hishida | 358/400 |
| 5,068,888 | 11/1991 | Scherk et al. | 358/403 |

Primary Examiner—Stephen Brinich
Attorney, Agent, or Firm—Fitzpatrick, Cella, Harper & Scinto

[57] ABSTRACT

The present invention includes a facsimile apparatus which transmits, at the least, a password, retrieval information, and destination information in accordance with a prescribed format, and an image database. The present invention offers an image database system consisting of a image database center apparatus which analyzes information from the transmission facsimile apparatus, retrieves a database corresponding to the information, and transmits the database to a facsimile apparatus indicated by the destination information, and an image communication apparatus constituting this system which accesses a image database according to a standardized access sheet from a G3 or a G4 facsimile apparatus and outputs it to a desired facsimile. In the present system, an access sheet can be sent to a database apparatus as image information. Therefore, the database apparatus can be accessed from existing facsimile terminals and the result of an execution on the database apparatus side can be posted to general facsimile terminals. In particular, a request execution result report including fee display can be automatically communicated to a facsimile of a client, and the database side can add up and display an additional fee such as a service charge to the client.

8 Claims, 18 Drawing Sheets

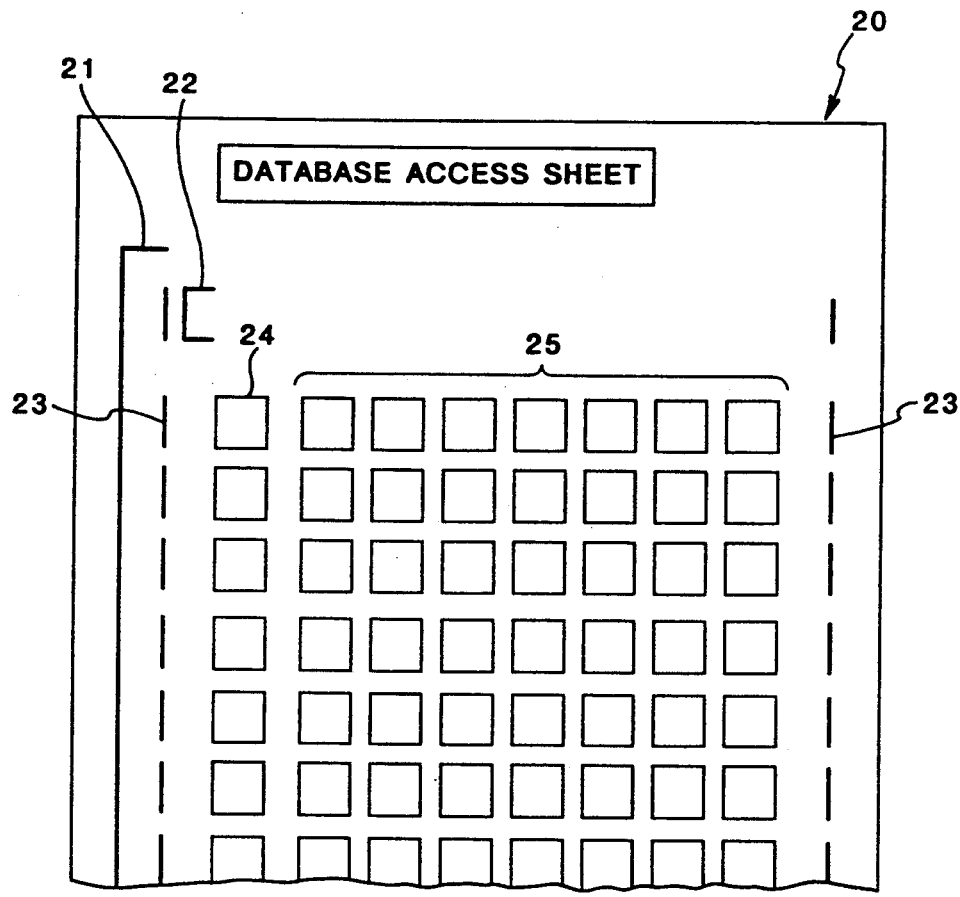

FIG. 2A

IDENTIFICATION CODES
'F' : INDICATES IMAGE FILE NAME
'3' : INDICATES TRANSMISSION DESTINATION NUMBER
(WILL BE TRANSMITTED TO G3 FACSIMILE)
'4' : INDICATES TRANSMISSION DESTINATION NUMBER
(WILL BE TRANSMITTED TO G4 FACSIMILE)
'P' : INDICATES PASSWORD
'E' : INDICATES THAT WRITING HAS BEEN TERMINATED.
WHEN THE CONTENT SPECIFIED BY 'E' IS '-', IT
INDICATES THAT IT IS NOT NECESSARY TO POST THE
RESULT OF THE EXECUTION.

FIG. 2B

FEE CALCULATION TABLE

| X |
|---|
| $(1 + \frac{X}{100})Y$ |

F I G. 8

91 {
```
*EXECUTION RESULT REPORT*
RESULT              OK
FEE                 1280 YEN
RECEPTION DAY       DECEMBER 31, 1988
AND TIME            23 : 59
```

92 {
DATABASE ACCESS SHEET

```
IC
  A d - 1 0 1 - A
  3 2 2 2 2 5 7
  4 7 6 5 4 3 2 1
  P A b E
  E -
```

F I G. 9

IMAGE COMMUNICATION APPARATUS AND IMAGE DATABASE SYSTEM USING THE SAME

BACKGROUND OF THE INVENTION

1. Field of the Invention

The present invention relates to an image communication apparatus and an image database system and, in particular, to an image communication apparatus and a image database system using the same which causes an ordinary facsimile apparatus to access a remote database and to retrieve and transmit a desired image data from the database.

2. Description of the Related Art

In a system of this type, a special communication protocol has been required for a facsimile apparatus which accesses database, or a telephone set attached to a facsimile terminal must be used to access it. In the former case, the facsimile terminal side must be equipped with a non-standard communication function for specifying desired image data to the database apparatus, or a communication protocol called MHS (message handling system) is required. Therefore, neither system is in common use, because types of facsimile apparatus are limited. In the latter case, it is necessary to give an instruction to a remote database apparatus by using a push tone of a telephone set and there exists a disadvantage in that an operation cannot be confirmed.

Under such a communication protocol, the result of an execution on the database side is posted and then printed and displayed at the terminal side. As a result, although the direct communication fee to the database side can be calculated from the facsimile terminal side which accesses the database, the terminal side belonging to the client cannot learn about the communication fee between another terminal and the database side on a request from the client terminal side. Further, selection of whether or not an execution result report is to be transmitted to the client facsimile has been made by the database side.

A system of this type is so arranged that a history of communication can be accumulated and stored. However, the history are limited to the day and time at which communication takes place, the communication period, the number of communication papers, destination information, and communication error information.

Since a system of this type is so arranged that a database is accessed by a handwritten sheet image, anybody out of users (contractors) to a database can access to a database if he handwrites a proper sheet and transmits it to the database side. In order to prevent this, the facsimile number of a facsimile terminal which transmits sheets must be discriminated in the communication protocol. That is, even if an attempt is made to discriminate the facsimile number of a facsimile terminal which transmits sheets, inconveniences will arise because some facsimiles will not declare their facsimile number. In general, a facsimile number is known to others, so it is not a secret. There is a limitation on the database side to manage all facsimile numbers of the users.

SUMMARY OF THE INVENTION

Thus, the present invention will be able to accomplish the following objects:

(1) Using an existing facsimile as terminal for accessing a database.

(2) Providing a facsimile whose handling of a database is simple, with diminished erroneous operations.

(3) Notifying an existing facsimile of the result of an execution on a database side.

(4) Immediately knowing the fee and communication costs of a request executed by a database side. Furthermore, in this case, the present invention should be able to respond to cases where a user who accesses a database from a certain terminal desires an execution result report, and a user who accesses the database from another terminal does not desire the report, and where among a plurality of users who access the database from the same terminal, some users desire a report and others do not desire a report.

(5) Storing with a small storage capacity in a detailed history of the results obtained by analyzing and judging the contents of a received sheet in order to confirm a detailed history regarding the contents of the received sheet, and (6) Including a method of discriminating users without depending on a facsimile number.

In order to achieve the above-mentioned objects, the image communication apparatus of the present invention comprises a means for receiving facsimile transmission data, a recognition means for recognizing, at the least, a password for accessing a database, retrieval information for retrieving a desired database, and destination information for specifying a destination facsimile to transmit retrieved image data, from a transmitted facsimile manuscript, a retrieval means for performing retrieval in accordance with the retrieval information and the password, and a facsimile transmission means for transmitting retrieved data to the destination facsimile according to the database information.

An image communication apparatus further comprises a report preparation means for preparing a report indicating the result of the execution of a retrieval, and a combination means for combining the report prepared by the report preparation means and the received facsimile manuscript, wherein a combined information is transmitted to the destination facsimile.

The report preparation means includes a means for writing a communication fee in the report.

The report preparation means includes a calculation means for determining a fee by performing a predetermined calculation on a communication fee and an output means for outputting the result of the calculation in the report.

An image communication apparatus further comprises an input means for accepting a calculation equation indicating the method of calculation by means of the calculation means.

A request to send the result of an execution of the retrieval to a client can be contained in the facsimile manuscript.

An image communication apparatus further comprises a storage means for storing the result of the discrimination by the recognition means.

An image database system of the present invention which retrieves a database by the transmission of a image from a facsimile comprises a facsimile apparatus which transmits, at the least, a password, retrieval information, and destination information in accordance with a predetermined format, and an image database center apparatus having an image database for analyzing the information from the transmission facsimile apparatus and transmitting the database retrieved corresponding to the information to a facsimile apparatus indicated by the destination information.

The facsimile apparatus is a G3 facsimile or a G4 facsimile, and the image database center apparatus includes functions of transmitting to and receiving from G3 facsimiles and G4 facsimiles in order to allow a request from G3 and G4 facsimile and an output to G3 and G4 facsimile.

The information from the transmission facsimile apparatus is transmitted by means of an access sheet of a format which has been previously standardized. Each information of the access sheet consists of an identification code for indicating the type of information and a content code for indicating the contents of the information.

According to the present invention, since an OCR database access sheet can be sent out to a database apparatus as image information, the database apparatus can be accessed from an existing facsimile terminal. Also, since a command can be issued to the database apparatus by a handwritten character, an advantage in that the contents of the command can be confirmed can be offered. The result of the execution on the database apparatus side can be posted to a general facsimile terminal. A request execution result report containing fee can be automatically communicated to a facsimile of a client. In addition, an additional fee such as a service charge can be added up and displayed to the client by the database side.

It can be determined from the contents of a received sheet whether a report is necessary or unnecessary. The contents of a received sheet with the communication history information such as the reception day and time, the transmission origination information, the result of the execution are stored and managed in order to be accumulated and kept. A password on the sheet can be distinguished by the database side which has received the sheet. Further, by comparing it with a password which has been previously registered in the apparatus, the secrecy of a database access can be secured.

These and other objects, features and advantages of the present invention will become clear reference to the following description of the preferred embodiments of the present invention, together with reference to the accompanying drawings.

BRIEF DESCRIPTION OF THE DRAWINGS

FIG. 2A is a view illustrating an example of a database access sheet;

FIG. 2B is a view illustrating an example of identification codes;

FIG. 5 is a block diagram illustrating an example of a database center apparatus;

FIGS. 6, 7, and 8 are views illustrating data formats of control information handled by the control section of the database center apparatus;

FIG. 9 is a view illustrating an essential portion of an execution result report in which the result of an execution by the database apparatus is written.

DESCRIPTION OF THE PREFERRED EMBODIMENTS

Figure 1:
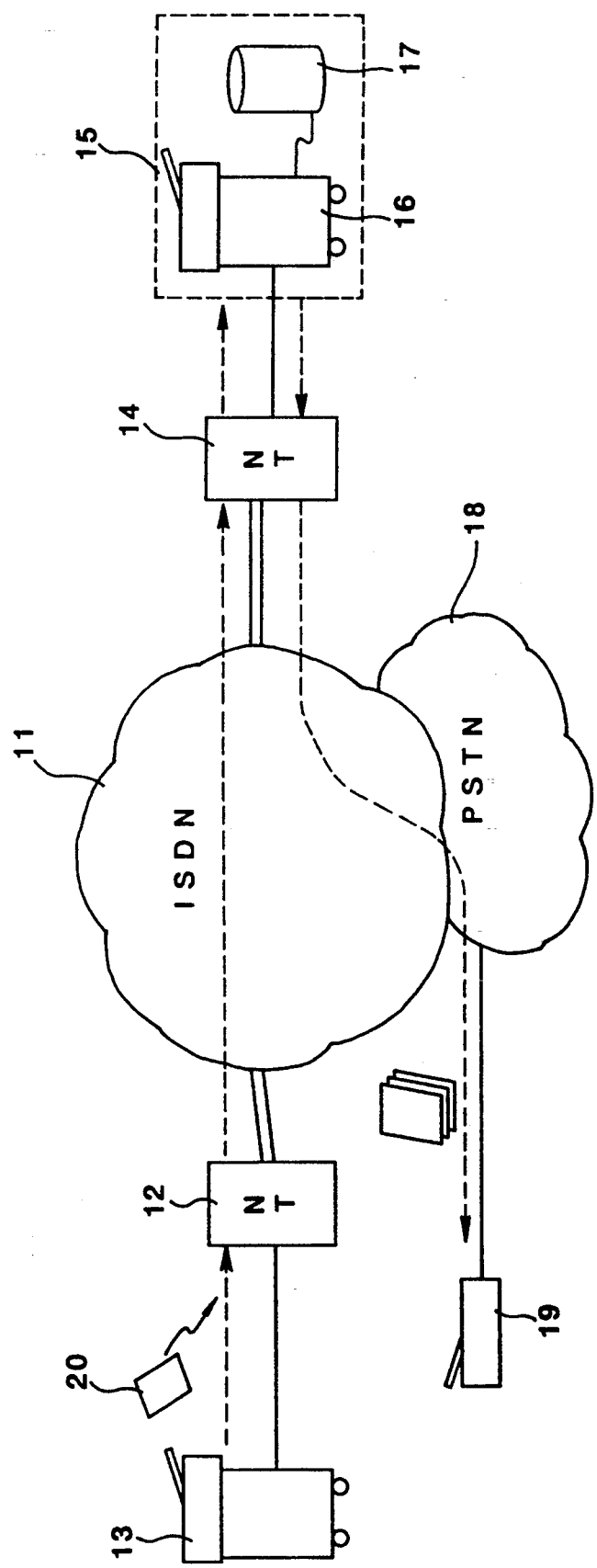
FIG. 1 is a block diagram illustrating the configuration of the preferred embodiment of an image database system.

FIG. 1 shows the outline of a image database system according to a preferred embodiment of the present invention.

This system comprises an ISDN (Integrated Service Digital Network) 11, a NT 12 and NT 14 which are network termination devices, an existing G4 facsimile terminal 13, an image database center apparatus 15. The image database center apparatus 15 consists of a facsimile section 16 having a G3 facsimile function and a G4 facsimile function, and an external storage means 17 in which image files are accumulated. The external storage means 17 may be a hard disk means. A PSTN 18 connected to this system is a general telephone line network which is interconnected to the ISDN 11. An existing G3 facsimile terminal 19 is connected to this general telephone line network.

Next, the operation for accessing a database of the image database center apparatus 15 by a facsimile terminal 13 will be explained.

According to this embodiment, a image file name to be retrieved, a destination facsimile number (a G3 facsimile 19 is assumed in this embodiment) to which it is desired to transmit the retrieved image file, and a password are handwritten on a database access sheet 20. The sheet 20 which has been prepared in this manner is read out by the facsimile 13 and transmitted as an image to the image database center apparatus 15. The image database center apparatus 15 receives an image of the sheet 20 and analyzes it through OCR, thus, it recognizes the command in the sheet. At this time, if the password which has been previously registered in the image database center apparatus 15 does not match the password written on the sheet 20, the apparatus 15 does not execute the contents of the command in the sheet 20. When the passwords match with each other, the image database center apparatus 15 searches the external storage means 17 for a specified image file in accordance with the contents of the command on the sheet 20 and transmits this image file to the facsimile terminal 19.

FIG. 2A shows an example of a format of the database access sheet 20 used in this embodiment.

In the figure, numeral 21 denotes a basic line for judging an OCR effective area, which indicates that an object character has been written on the right side of this black line. Numeral 22 denotes a mark for showing that the sheet 20 is a database access sheet. Numeral 23 denotes an indicator for indicating a line. The presence and inclination of a line can be recognized by the pair of right and left indicators. Numeral 24 and 25 denotes frames printed in a light blue color (dropout color), inside of which characters must be handwritten. The leftmost frame 24 is an identification code writing column, and other columns 25 on the right of the writing frame 24 are content writing sections. The number in the frame 24 is a code for showing what the contents of a line written in the content writing section 25 denote, and examples of these codes are shown in FIG. 2B.

Figure 3:
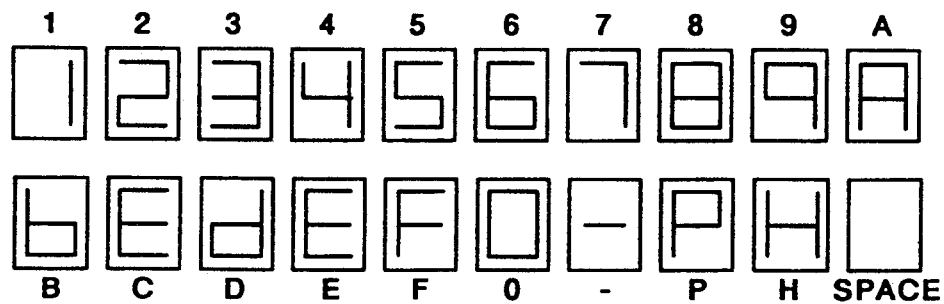
FIG. 3 is a view illustrating an example of characters which can be used on the database access sheet.

FIG. 3 shows examples of characters which can be used on the sheet 20. In this embodiment, a format of a character which are based on a rectangular letter "8" is adopted.

Figure 4:
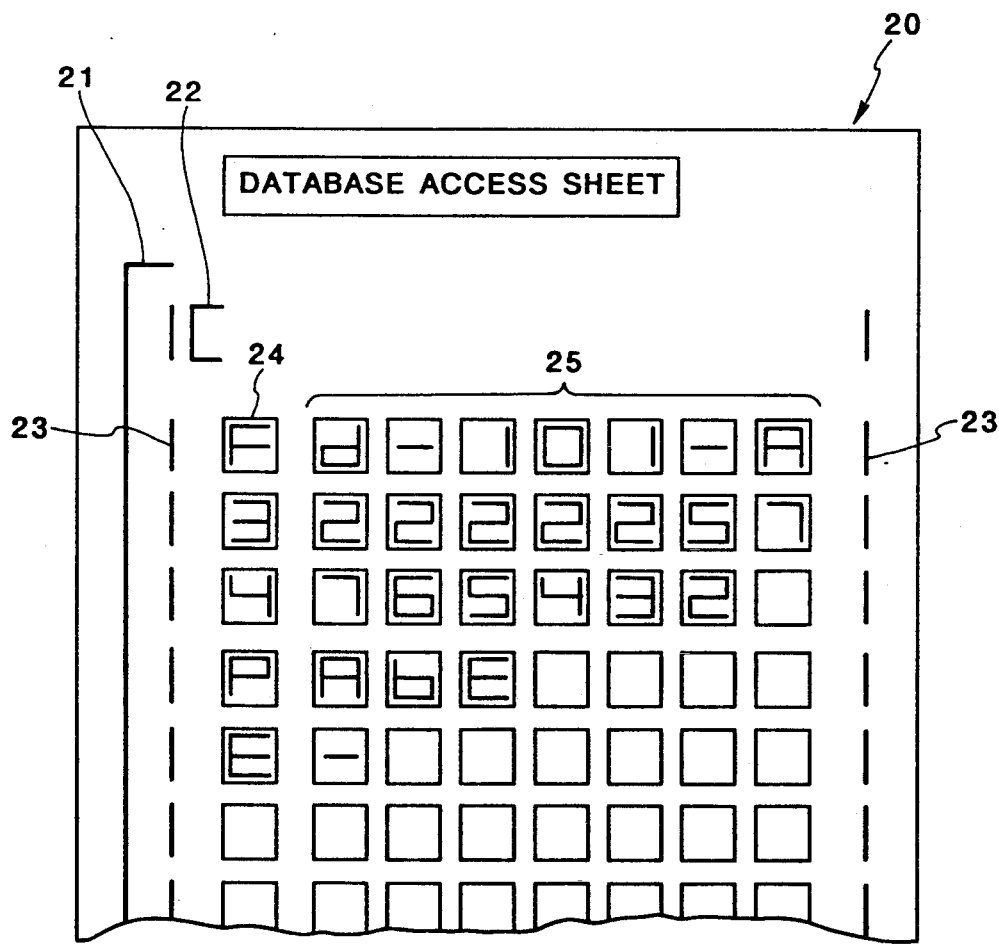
FIG. 4 is a view illustrating an example of the written database access sheet.

FIG. 4 shows an example of how to write a sheet. "F" is written in the identification code column, the leftmost frame 24, which indicates that this line is an image file name. In this example, an image file name of "d-101-A" is requested. "3" is written in the identification code column of the second line, which indicates that this line is a transmission destination number. In this example, a G3 facsimile is specified as a destination to which "d-101-A" is sent out, and a facsimile number "2222257" is specified. Likewise, a G4 facsimile is specified in the content writing section of the third line, which indicates a facsimile number "7654321". The content writing section of the fourth line is a writing column for a password, in which "AbE" is written. The fifth line indicates that the information of the sheet 20 is completed. Since "E" is followed by "-", the result of the execution will not be posted.

When the above-mentioned sheet 20 is transmitted to the image database center apparatus 15, the apparatus 15 broadcasts a series of images named as "d-101-A" to a G3 facsimile "2222257" and a G4 facsimile "7654321".

The example of the construction of the image database center apparatus 15 will be explained with reference to FIG. 5. The image database center apparatus 15 comprises a CPU 5A which constitutes a control section, a ROM 5B and RAM 5C in which programs for the CPU 5A and a character font generator are stored, a known image encoder 5D for taking natural images, encoding them into facsimile codes one after the other (MH encoding, MMR encoding, etc. are possible), and outputting them, a known image decoder 5E for decoding facsimile-encoded images to return them to natural images and outputting them to an OCR unit 5F, and the OCR unit 5F having the functions of performing OCR analysis on the natural image inputted from the image decoder 5E and of posting the result of the analysis to the CPU 5A.

The image database center apparatus 15 further comprises a G4 facsimile's communication control section 5H, a G3 facsimile's communication control section 5J, a known ISDN terminal adaptor unit 5M for connecting the ISDN 11 to the G4 facsimile's communication control section 5H and the G3 facsimile's communication control section 5J, a natural image buffer memory 5K, a known interface circuit section 5L (in this embodiment SCSI interface is adopted) for a hard disk means 5Q. The image database center apparatus 15 includes an operation panel 5R and is connected to the above-mentioned respective components by a CPU bus 51. Numeral 57 denotes an ISDN bus line which is connected to the NT 14 shown in FIG. 1.

Figures 5, 6:
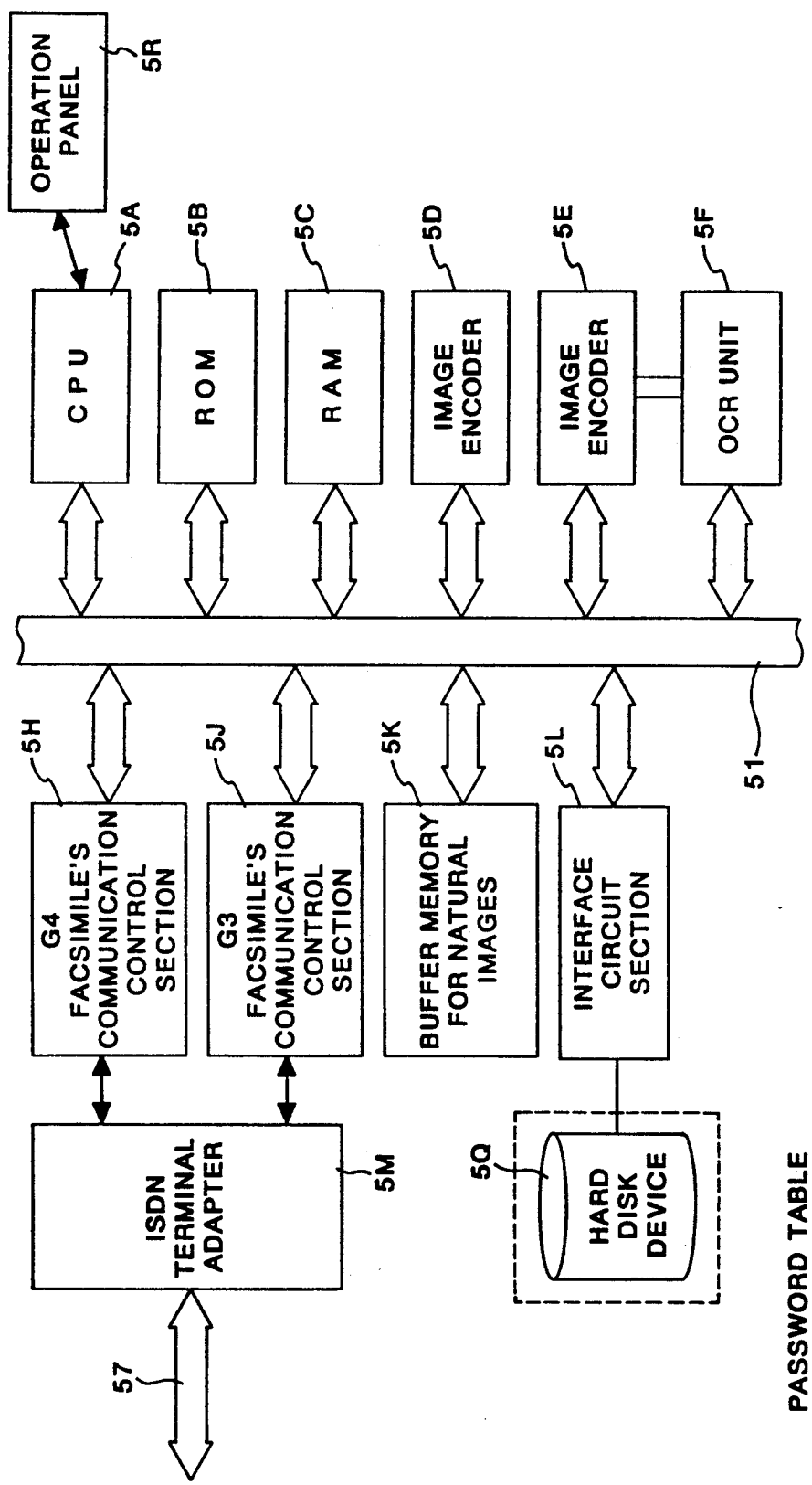
Figure 7:
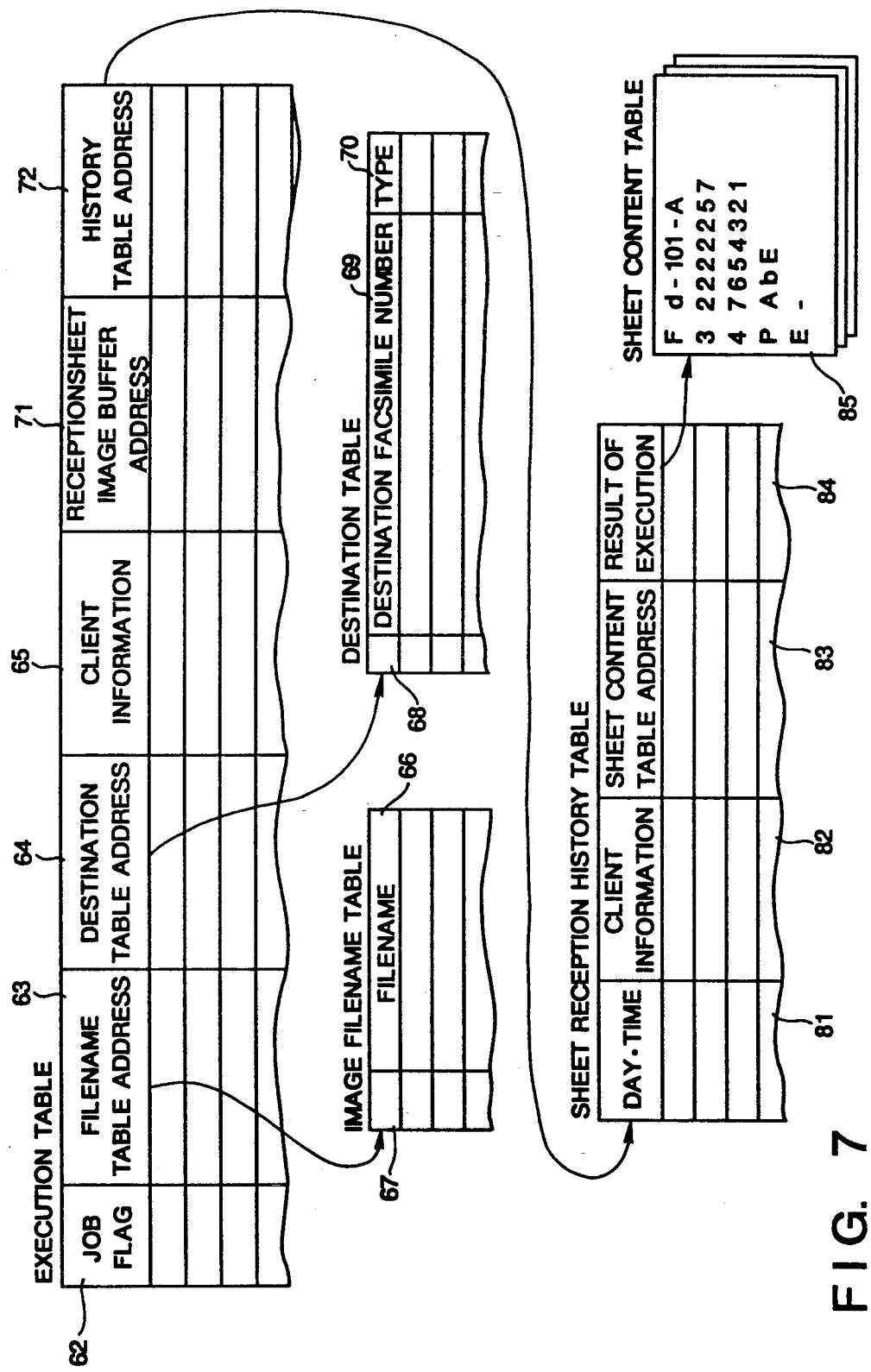

FIGS. 6, 7, and 8 are views for explaining control information handled by the control section. This control information is developed in the RAM 5C in FIG. 5.

FIG. 6 shows a password table in which the password information which has been previously registered in the RAM 5C is stored. The contents of this table are compared with the password information on the OCR sheet. If they match, the contents of the command on the OCR sheet are executed.

FIG. 7 shows an execution table. This table is an operation control table in the RAM 5C under which the image database center apparatus 15 receives the OCR sheet and operates in accordance with the command. A job flag 62 is for indicating the status of the execution. There are statuses included "In reception", "In analysis", "In execution", "Termination process", and "Blank line" in these statuses. "Blank line" indicates that the line of the execution table is in a usable (vacant) state. The filename table address 63 contains addresses for storing filenames specified in the OCR sheet in the filename table (flag 67 and filename 66). The destination table address 64 addresses for storing the destination information specified in the OCR sheet in the destination table (flag 68, destination facsimile number 69, and type 70).

The flag 67 of the filename table is for indicating that when the flag is "0", the file name is invalid; when "1", a file name has been written. In the item of the type 70 of the destination table is an area in which is written whether the destination is a G3 facsimile or a G4 facsimile. A flag 68 is for indicating that when the flag is "0", the destination is invalid; when "1", the valid destination has been written. In client information 65 is stored information of a client who has requested the retrieval of an image database. In a reception sheet image buffer address 71 is written an address for specifying an area in the natural image buffer memory 5K, in which reception sheets transmitted from clients are temporarily buffered in order to analyze them and confirm the success or failure of the operation by receiving a result report after operation. In a history table address 72 is written an address for specifying a sheet reception history table in which the history of the reception of the sheets for database retrieval up to the present time is stored.

The sheet reception history table is an area in which the history of the contents of the OCR sheets and the results of the execution are stored, and the history includes the day and time 81 on which a sheet is received, client information 82, a sheet content table address 83, and an execution result 84. The sheet content table address 83 points a sheet content table 85.

After a communication through an ISDN line, a communication fee is posted to the terminal side from the line side. FIG. 8 shows an area in which a calculation equation for the fee is stored. For example, if it is supposed that X has been previously set to 10 in the image database center apparatus 15 and the above-mentioned fee posted from the line side is 100 yen, the result of the calculation will be 110 yen from the following calculation:

$$\left(1 + \frac{10}{100}\right) \times 100 = 110.$$

FIG. 9 shows an example of an execution result report sent out to the client facsimile after the content of the OCR sheet is executed by the image database center apparatus 15. This report consists of a report section 91 and a image section 92 which is sent back for the confirmation of OCR sheets transmitted from the client. In the report is written the result of the execution, the fee, and the reception day and time. The result of the calculation explained in FIG. 8 is reflected in the fee.

FIGS. 10 to 15 are flowcharts for showing the operation procedure of the image database center apparatus 15.

Figure 10:
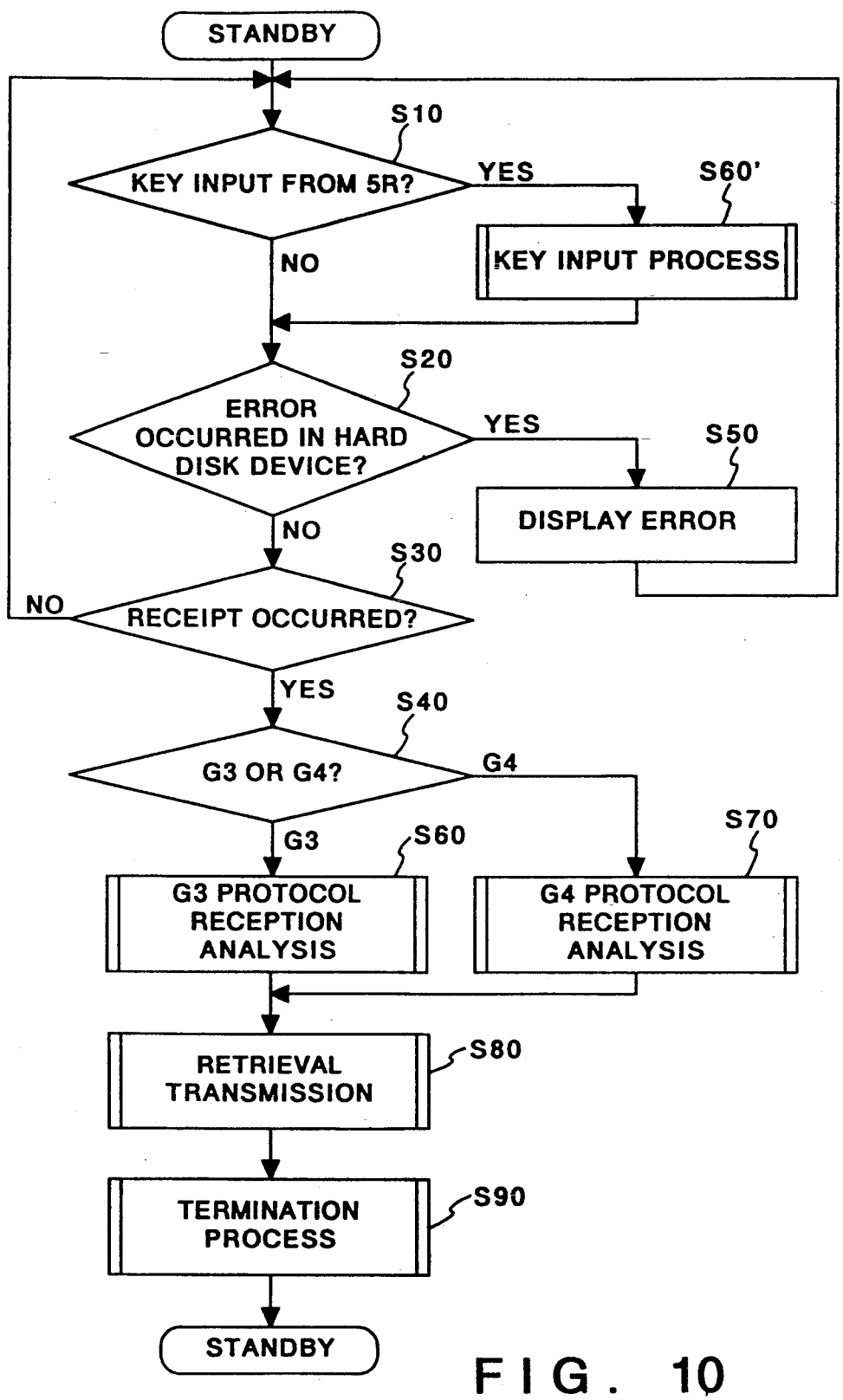
FIGS. 10 to 15 are flowcharts illustrating the control procedure that the control section of the database center apparatus performs.

First, the entire flow will be explained with reference to FIG. 10. In a standby state, it is determined whether or not key inputs have been entered from the operation panel 5R in step S10. When yes, the process goes to the key operation of step S60' (FIG. 15); when no, key input step S20 is executed. If an error has occurred in the hard disk means 5Q, this error is informed in step S50; if no error, the process goes to step S30 where it is checked whether or not the receipt has occurred. When the receipt is recognized, it is checked whether the receipt has been made from the G3 or G4 terminal. In the case of G3, the process goes to step S60; in the case of G4, the process goes to step S70.

Figure 11A:
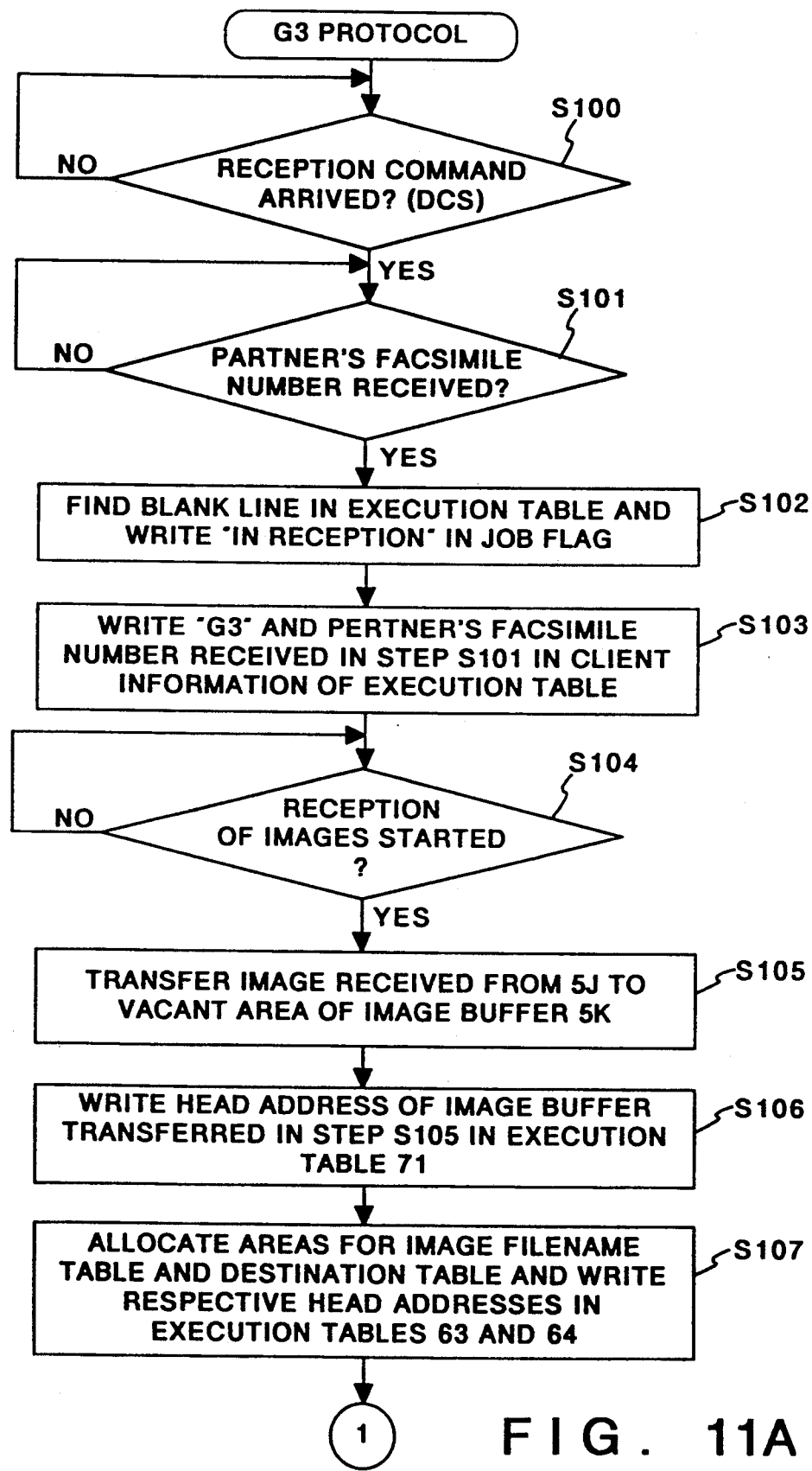
Figure 11B:
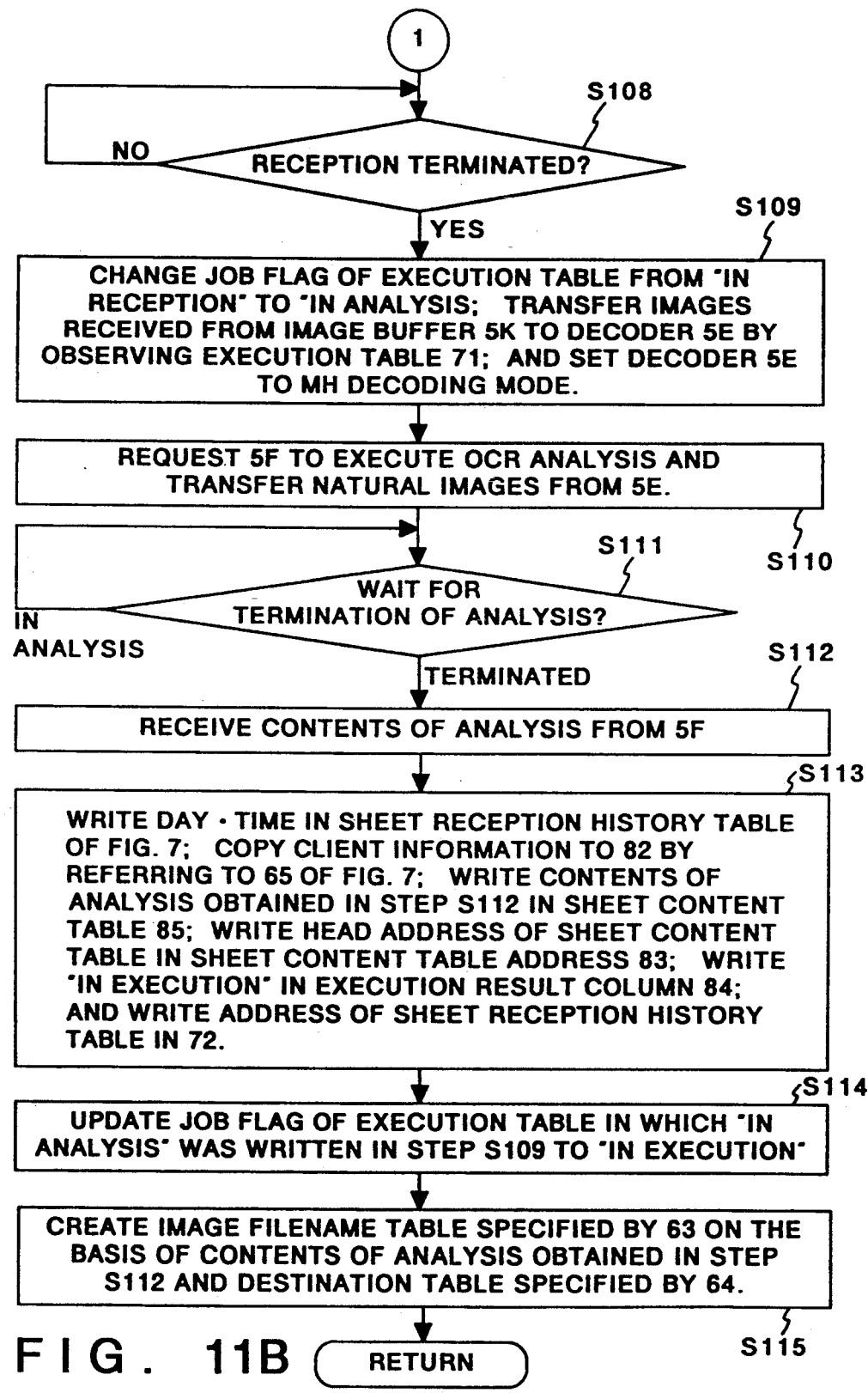

When it is determined that a reception from a G3 facsimile has been made, a routine of FIG. 11 is executed as the control of step S60. Whether or not a reception command has arrived is determined in step S100. When the reception command has arrived, partner's facsimile number reception is discriminated in step S101 and a blank line in the execution table is found and "In reception" is written in that line in step S102. In step S103, "G3" and the partner's facsimile number received in step S101 are written in the client information of the execution table. In step S104, the reception of images by the G3 protocol is started. In step S105, received images are transferred to vacant areas in the image buffer 5K from a facsimile communication control section 5J. In step S106, the head address of the image buffer transferred in step S105 is written in the reception sheet image buffer address 71. In step S107, areas for image filenames and the destination table are allocated and respective head addresses are written in the filename table address 63 and the destination table address 64 of the execution table.

Next, the termination of reception is determined in step S108. In step S109, the job flag of the execution table is changed from "In reception" to "In analysis". Received images are transferred to the decoder 5E from the image buffer 5K by observing the reception sheet image buffer address 71 of the execution table. The decoder 5E is set to the MH decoding mode. The OCR unit 5F is requested to execute OCR analysis in step S110 and unprocessed image is transferred from the decoder 5E. In step S111, an analysis signal is received. In step S112, the contents of the analysis are received from the OCR unit 5F. In step S113, the day and time are written in the sheet reception history table of FIG. 7, it is copied to the client information 82 of the sheet reception history table by referring to the client information 65 of FIG. 6, the contents of the analysis obtained in step S112 are written in the sheet content table 85, and the head address of the sheet content table is written in the sheet content table address 83. In the execution result column is written "In execution".

In step S114, the job flag of the execution table in which "In analysis" was written in step S109 is modified to "In execution". In step S115, an image filename table specified by the filename table address 63 and a destination table specified by the destination table address 64 are created on the basis of the contents of the analysis obtained in step S112.

Figure 12A:
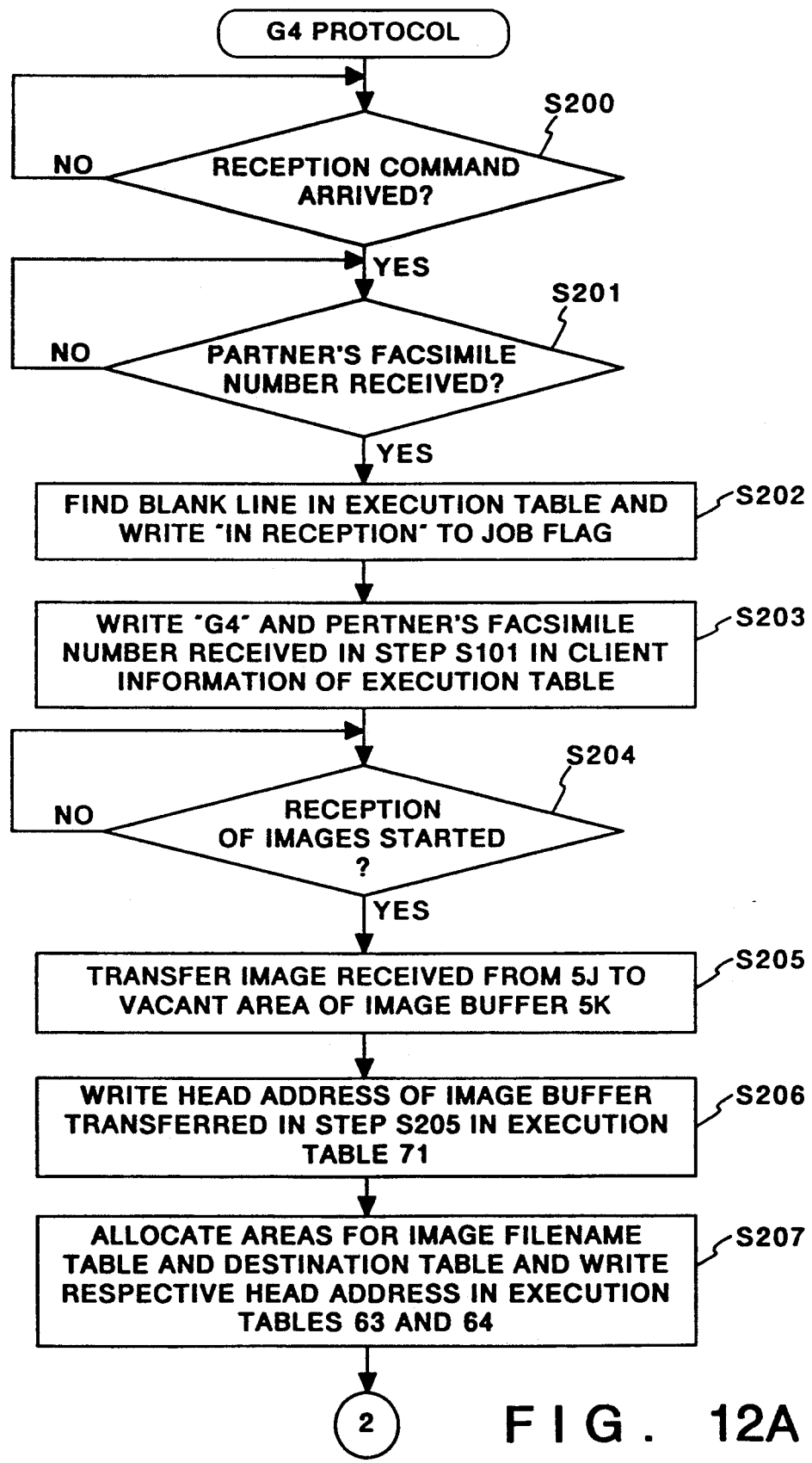
Figure 12B:
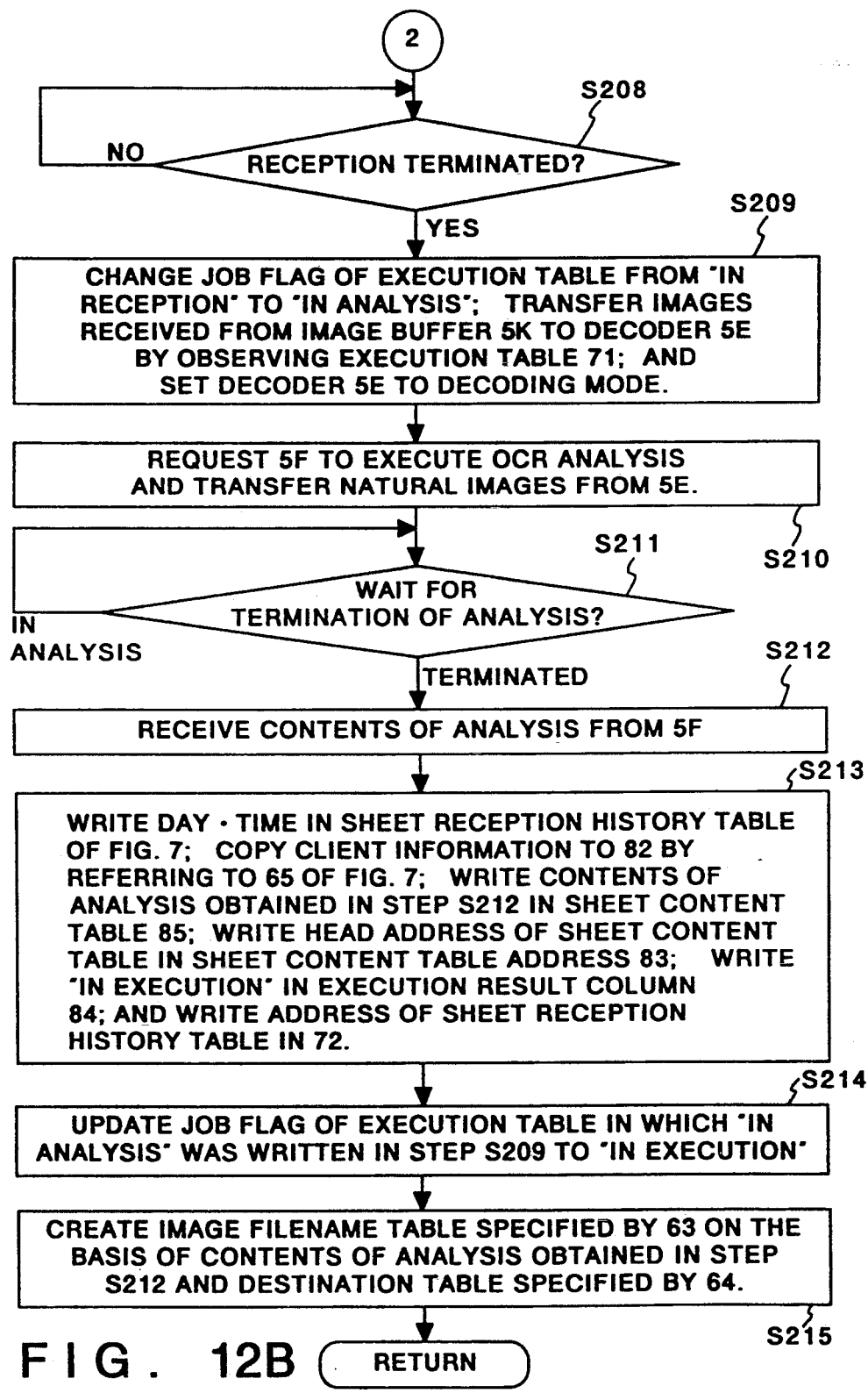

Meanwhile, in the case of the reception from a G4 facsimile, whether a reception command has arrived is determined in step S200 in which a routine of FIG. 12 is executed as the control of step S70. In step S201, partner's facsimile number reception is discriminated. In step S202, a blank line of the execution table is found and "In reception" is written in the job flag. In step S203, "G4" and partner's facsimile number received in step S201 are written in the client information of the execution table. In step S204, the reception of images under the G4 protocol is started. In step S205, received images are transferred to vacant areas of the image buffer 5K from 5J. In step S206, the head address of the image buffer transferred in step S105 is written in the reception sheet image buffer address 71 of the execution table. In step S207, areas for an image filename and a destination table are allocated and respective addresses are written in the file table addresses 63 and 64 of the execution table.

Next, the termination of the reception is determined in step S208. In step S209, the job flag of the execution table is changed from "In reception" to "In analysis". By observing the reception sheet image buffer address 71 of the execution table, received image is transferred to the decoder 5E from the image buffer 5K. The decoder 5E is set to the decoding mode. In step S210, the OCR unit 5F is requested to execute OCR analysis and natural images are transferred from the decoder 5E. In step S212, the contents of the analysis are received from the OCR unit 5F. In step S213, the day and time are written in the sheet reception history table in FIG. 7. By referring to the client information 65 of FIG. 6, the client information is copied to the client information 82 of the sheet reception history table. The contents of the analysis obtained in step S212 are written in the sheet content table 85. The head address of the sheet content table is written in the sheet content table address 83. "In execution" is written in the execution result column 84.

In step S214, the job flag of the execution table in which "In analysis" was written in step S209 is modified to "In execution". In step S215, an image filename table specified by the filename table address 63 and a destination table specified by the destination table address 64 are created on the basis of the contents of the analysis obtained in step S212.

When the reception and analysis of the retrieval information mentioned above are terminated, the retrieval of the database and the transmission of the results of the retrieval are started in step S80.

Figure 13A:
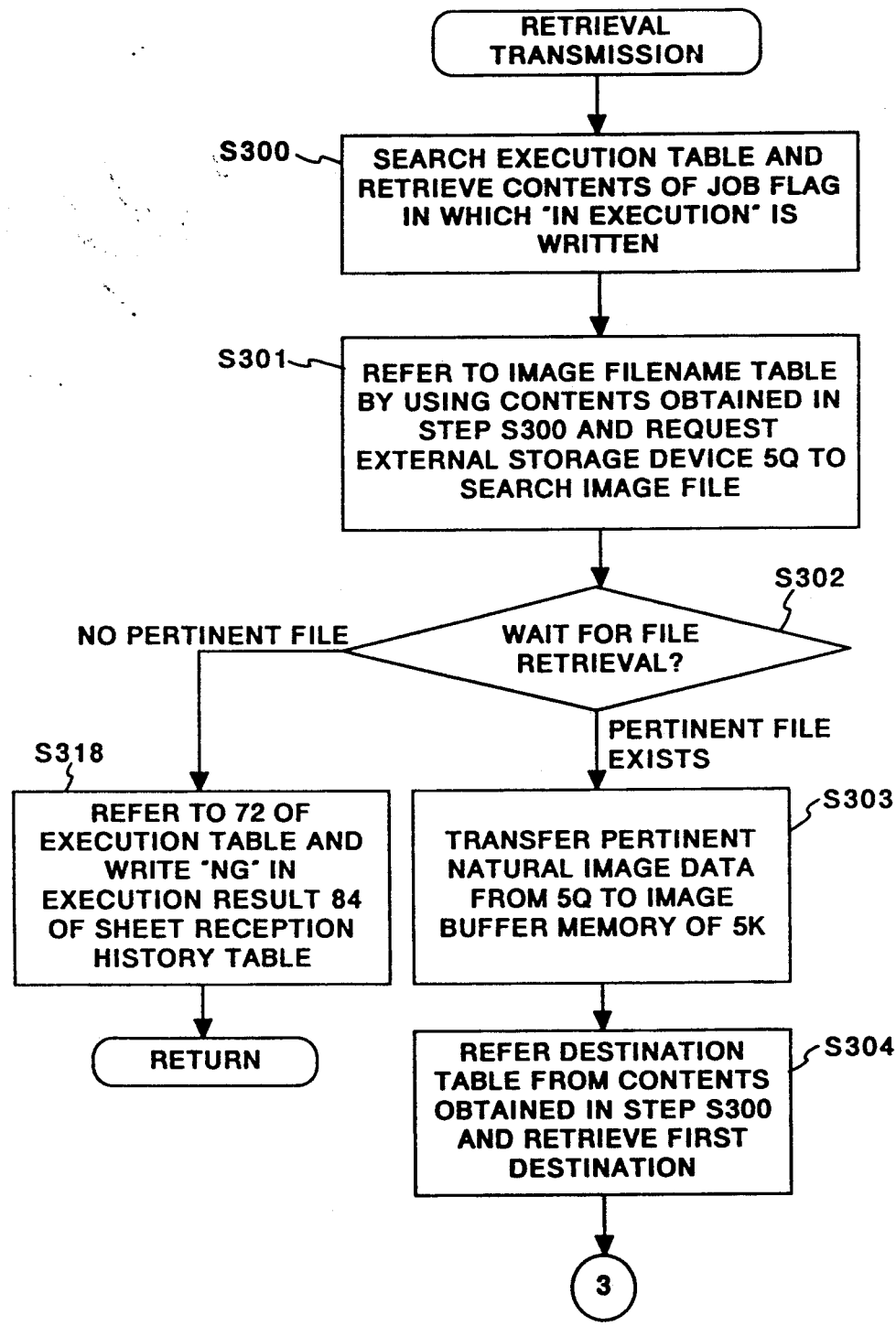
Figure 13B:
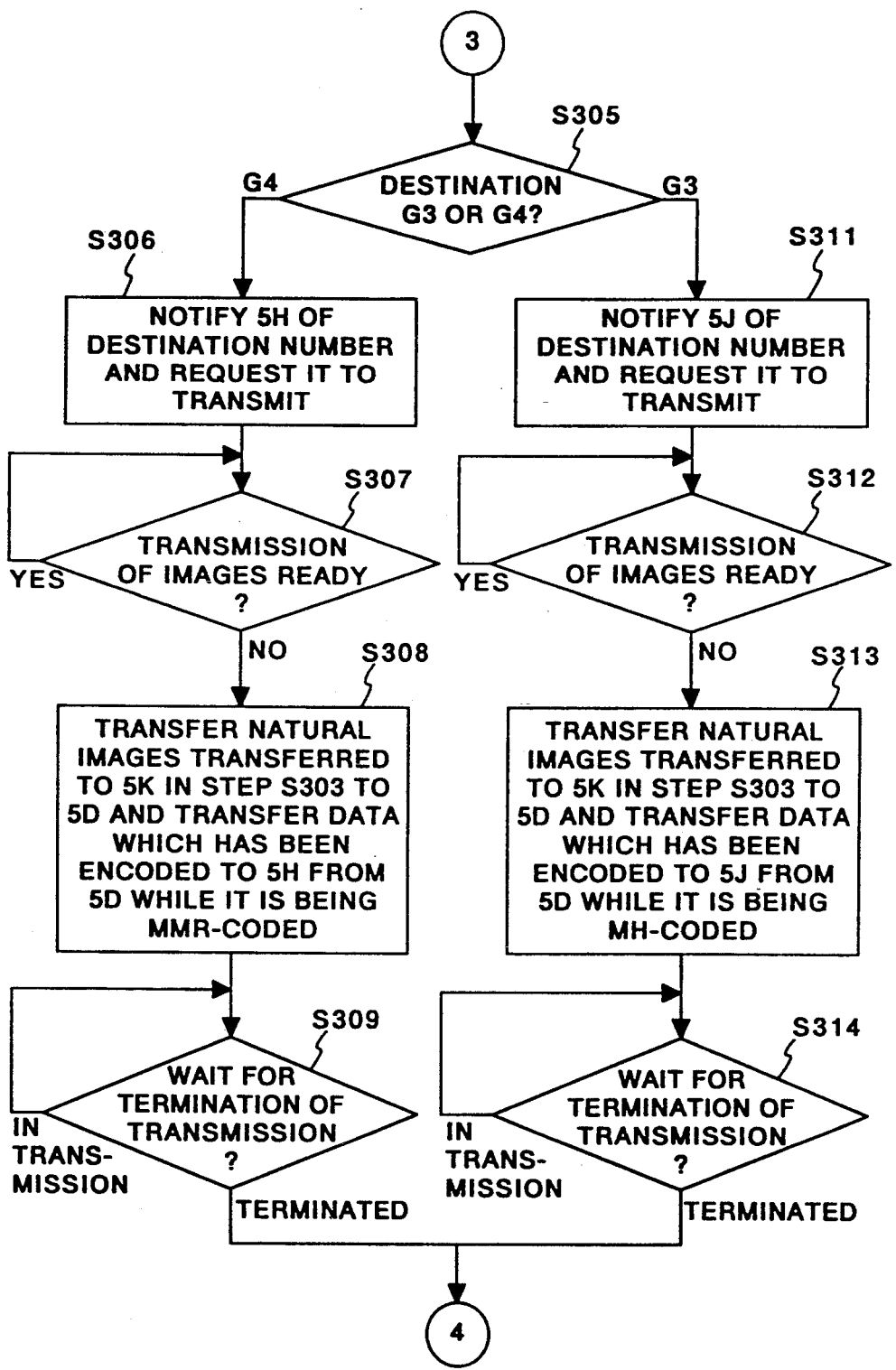
Figure 13C:
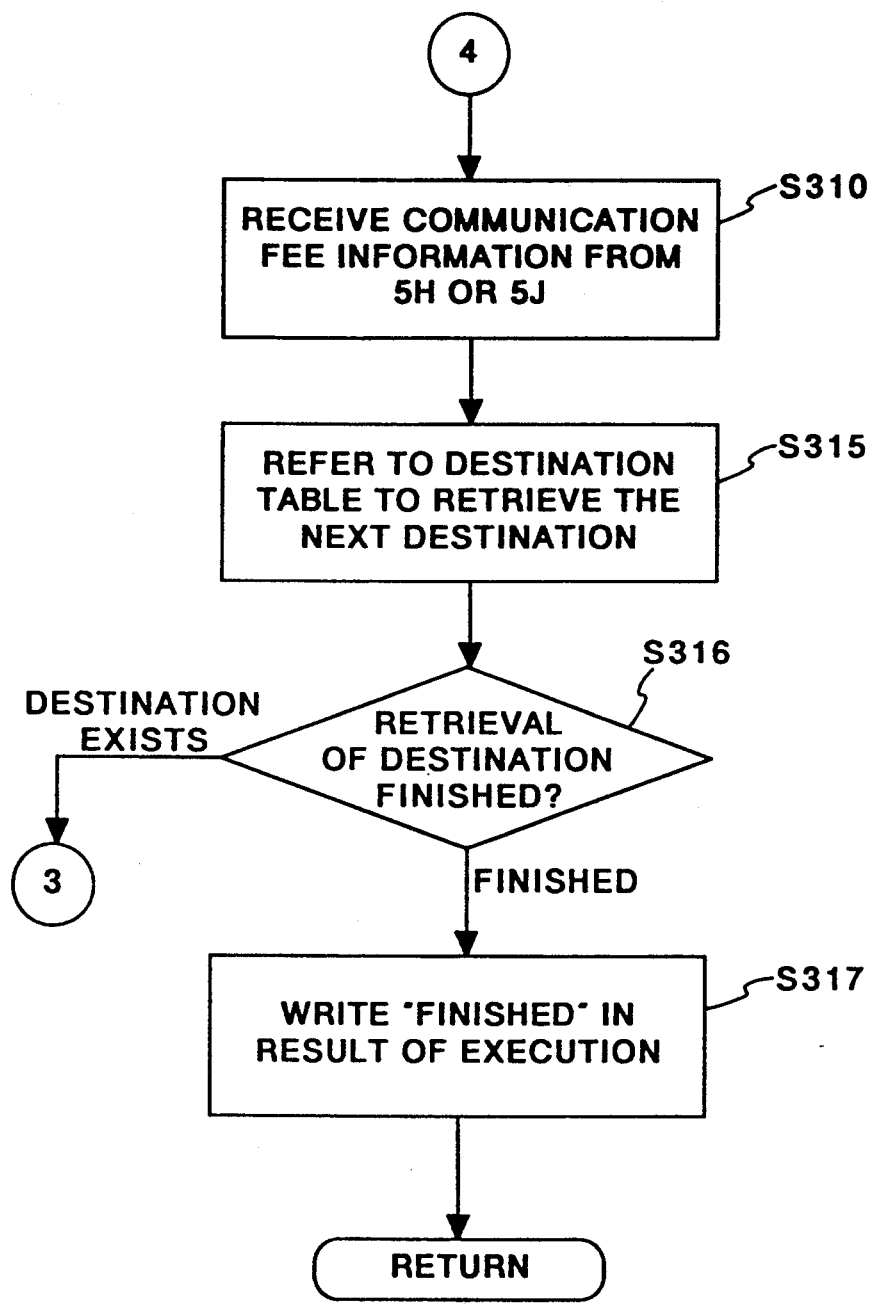
Figure 14A:
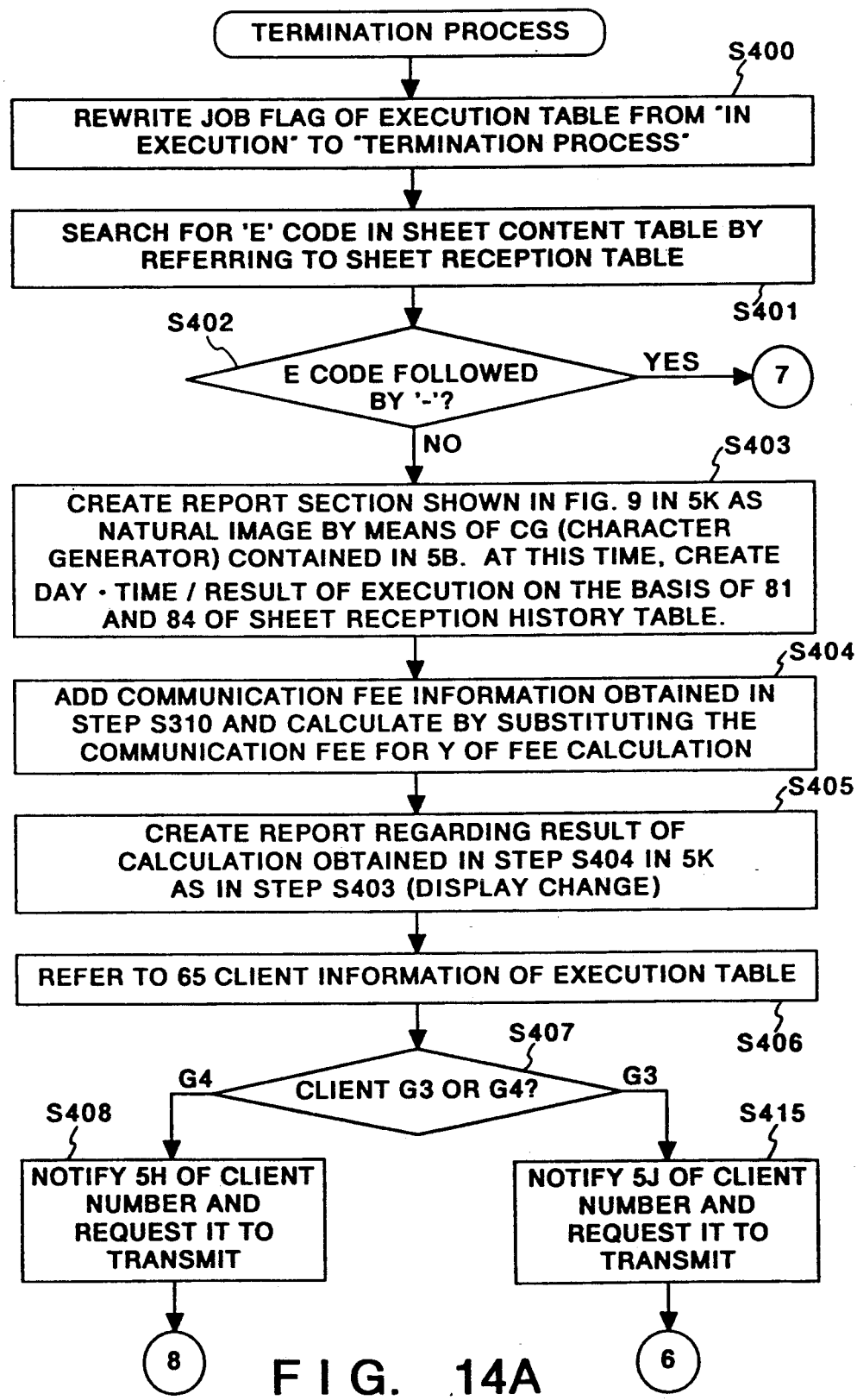
Figure 14B:
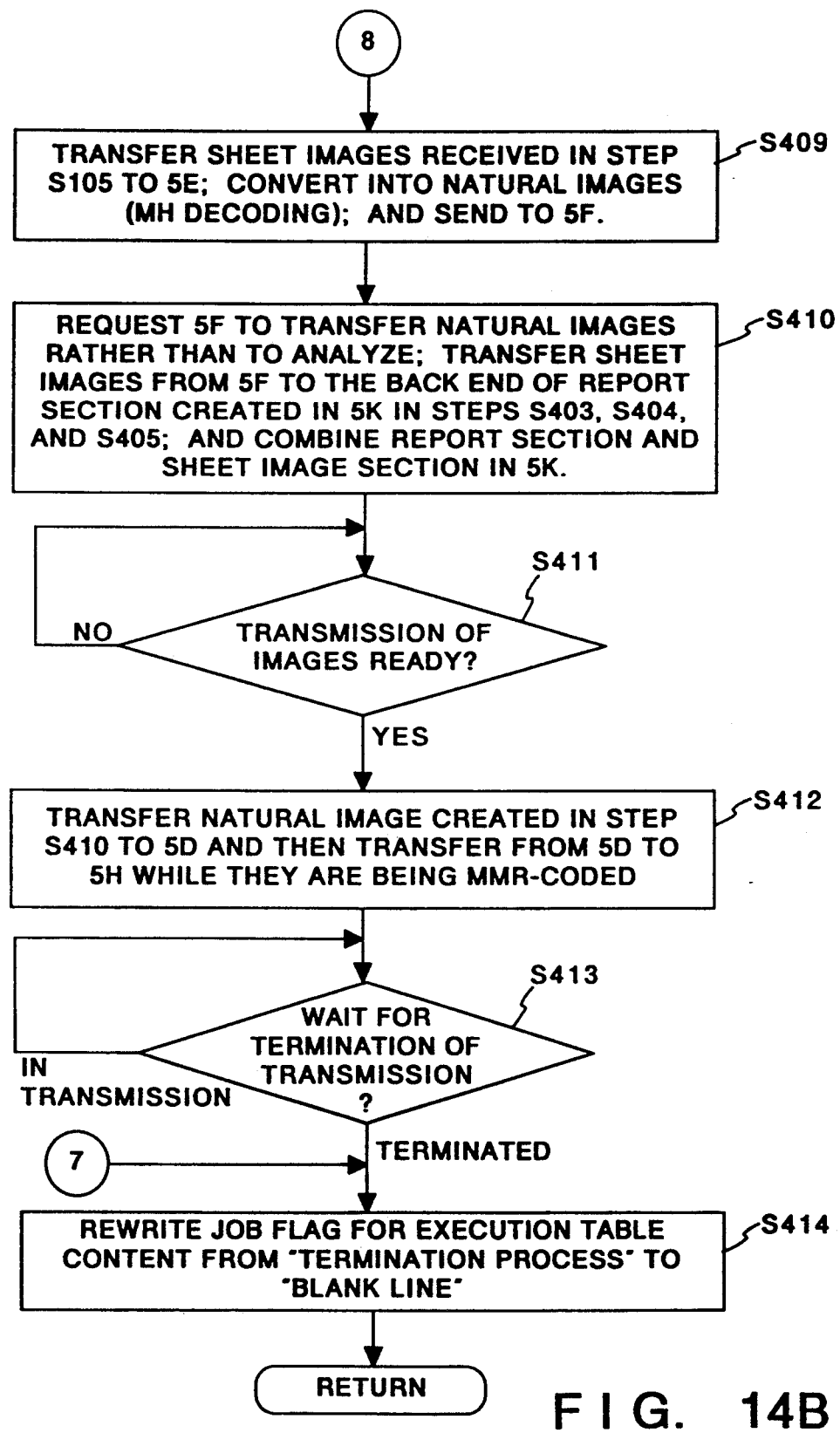
Figure 14C:
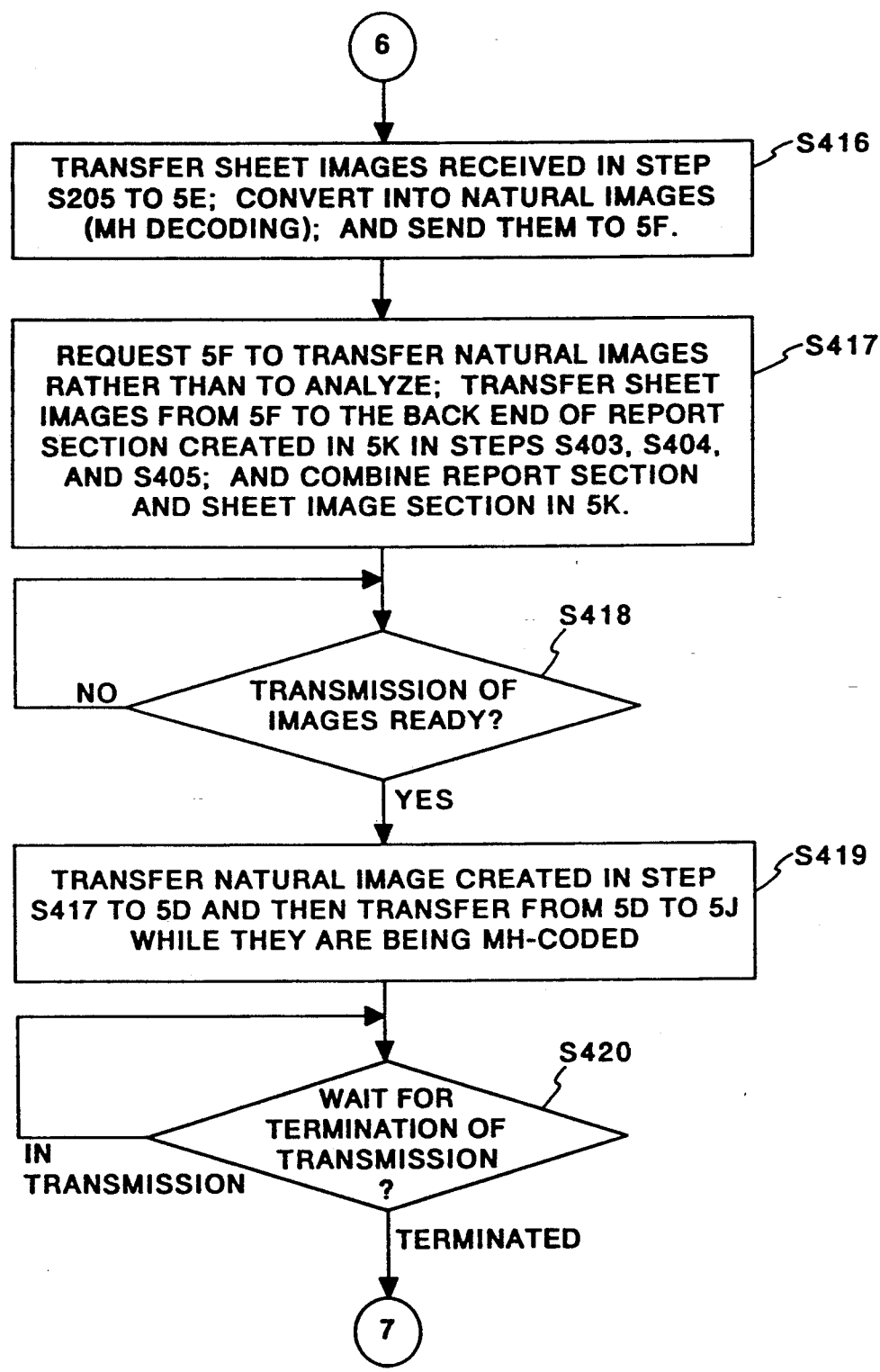

FIG. 13 is a flowchart for illustrating the procedure for the retrieval of a database and the transmission routine of step S80. The execution table is searched in step S300 and the contents of the job flag in which "In execution" is written are retrieved. In step S301, a request to retrieve the hard disk means 5Q is made by referring to the image filename table by using the contents obtained in step S300. In step S302, the process waits for the termination of the file retrieval, and if there exists a pertinent file, the pertinent natural image data is transferred to the image buffer memory 5K from the external hard disk means 5Q in step S303. In step S304, the first destination is retrieved by referring to the destination table by using the contents obtained in step S300. In step S305, it is determined whether the destination is a G3 or a G4 facsimile.

In the case of a G4 facsimile, the process goes to step S306 in which the destination number is informed to the G4 facsimile's communication control section 5H in order to request to transmit. In step S307, the process waits for the image transmission ready state. In step S308, natural image transferred to the natural image buffer memory 5K in step S303 is transferred to the image encoder 5D and then encoded data from the image encoder 5D is transferred to the G4 facsimile's communication control section 5H with natural images being MMR-coded. The process waits for the termination of the transmission in step S309.

When it is determined in step S309 that the destination is a G3 facsimile, the process goes to step S311 in which a destination number is informed to the G3 facsimile's communication control section 5J in order to request to transmit. The process waits for the image transmission ready state. In step S313, natural images transferred to the natural image buffer memory 5K in step S303 is transferred to the image encoder 5D and data which has been encoded by the image encoder 5D is transferred to the G3 facsimile's communication control section 5J with being MH-encoded. The process waits for the termination of the transmission in step S314.

When the transmission is terminated, the information of communication fee is received from the G4 facsimile's communication control section 5H or the G3 facsimile's communication control section 5J in step S310. At this time, one complete data service is terminated, so the next destination is retrieved by referring to the destination table in step S315. Next, it is checked whether or not all the destinations have been retrieved in step S316. If a destination remains, control is returned to step S305; if no destination remains, "Terminated" is written in the execution result 84 of the sheet reception history table in step S317 and the process returns to where the process originated.

Meanwhile, where no pertinent file exists in step S302, "NG" is written in the execution result 84 of the sheet reception history table by referring to the history table address 72 of the execution table in step S318.

When the retrieval transmission of step S80 is terminated, a termination process is performed in step S90. A description will be given of termination process routines with reference to the flowcharts of FIG. 14.

In step S400, the job flag of the execution table referred to in step S300 is rewritten from "In execution" to "Termination process". In step S40, "E" code in the sheet content table is retrieved by referring to the sheet reception history table. In step S402, it is determined whether the "E" code is followed by "-". If yes, the report section shown in FIG. 9 is created as a natural image in the natural image buffer memory 5K by means of a CG (character generator) contained in the ROM 5B in step S403. At this time, the day and time/result of execution are prepared on the basis of the day and time 81 and the result of execution 84. In step S404, the information of communication fee obtained in step S310 is added and the fee is calculated by substituting the communication fee for Y of the fee calculation table of FIG. 8. In step S405, a report is created in the natural image buffer memory 5K from the result of the calculation obtained in step S404, as was done in step S403 (fee indication). In step S406, reference is made to the client information of the execution table referred to in step S300. It is determined whether or not the client is a G3 or a G4 facsimile. In the case of a G4 facsimile, the process goes to step S408 in which the client number is informed to the G4 facsimile's communication control section 5H in order to request to transmit. In the case of a G3 facsimile, the process goes to step S415 in which the client number is posted to the G3 facsimile's communication control section 5J in order to request to transmit.

Thereafter, in step S409, the sheet image received in step S105 is transferred to the image decoder 5E in which the sheet image is converted into natural images (MH decoding) and the image is sent out to the OCR unit 5F. In step S410, a request to transfer the natural image is issued to the OCR unit 5F. In steps S411 to S413, the sheet image is transferred to the back end of the report section prepared in the natural image buffer memory 5K from the OCR unit 5F, and the report section and the sheet image section are combined in the natural image buffer memory 5K. That is, the process waits for the image transmission ready state in step S411, and when ready, the natural image prepared in step S410 is transferred to the image encoder 5D and transferred to the G4 facsimile's communication control section 5H with MMR-encoded in step S412. The process waits for the termination of the transmission in step S413. When the transmission is terminated, the process goes to step S414 in which the job flag is rewritten from "Termination process" to "Blank line", and enters the standby state.

Meanwhile, in step S416, the sheet image received in step S205 is transferred to the image decoder 5E in which it is converted into natural images (MH decoding), and the image is sent out to the OCR unit 5F. In step S417, a request to transfer the natural image is issued to the OCR unit 5F. In steps S418 to S420, the sheet image is transferred to the back end of the report section prepared in the natural image buffer memory 5K from the OCR unit 5F, and the report section and the sheet image section are combined in the natural image buffer memory 5K. That is, the process waits for the image transmission ready state in step S418. In step S419, the natural image prepared in step S417 is transferred to the image encoder 5D and they are transferred to the G3 facsimile's communication control section 5J from the image encoder 5D, the image is with MMR-encoded. The process waits for the termination of the transmission in step S420. When the transmission is terminated, the process goes to step S414 in which the job flag of the execution table is rewritten from "Termination process" to "Blank line" and enters the standby state.

Figure 15:
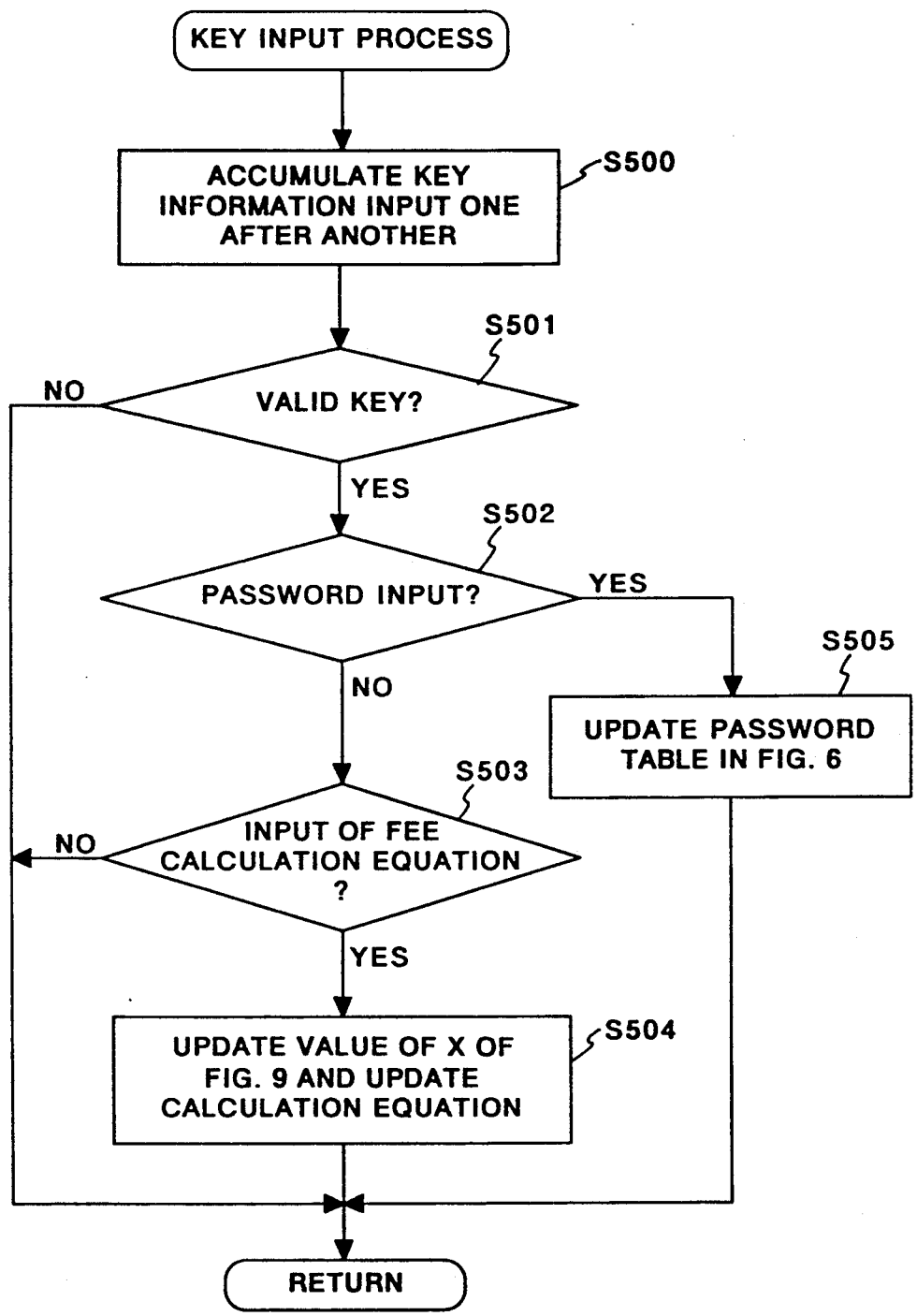

FIG. 15 is a flowchart of a key input routine of step S60' which is executed when a key input is entered from the operation panel 5R in the standby state. First, key input information in step S500 is stored. Then, it is determined whether or not the key is a valid key in step S501. In step S502, it is determined whether or not a password has been input. If it is a valid key and a password has been input, the process goes to step S505 in which the password table of FIG. 6 is rewritten. If a password has not been input, the process goes to step S503 in which whether or not a fee calculation equation has been input is determined. If a calculation equation has been input, the value of X and the calculation equation as shown in FIG. 8 are rewritten in step S504. If the key is not a valid key or if neither a password nor a calculation equation has been input, the process returns to where the process originated.

Many widely different embodiments of the present invention can be made without departing from the spirit and scope thereof, therefore, it is to be understood that this invention is not limited to the specific embodiments thereof except as defined in the appended claims.

What is claimed is:

1. An image communication apparatus comprising:
   means for receiving facsimile transmission data;
   recognition means for recognizing, at the least, a password for accessing a database, retrieval information for retrieving a desired database, and destination information for specifying a destination facsimile for retrieved image data, from a received facsimile image;
   retrieval means for performing retrieval in accordance with said retrieval information and said password;

facsimile transmission means for transmitting retrieved data to said destination facsimile according to said destination information;

report generating means for generating a result of an execution of the retrieval; and combination means for combining a report generated by said report generating means and said received facsimile image, wherein the combined information is transmitted to said destination facsimile.

2. The image communication apparatus according to claim 1, wherein said report generating means includes a means for writing a communication fee into said report.

3. The image communication apparatus according to claim 1, wherein said report generating means includes calculation means for determining a fee by performing a predetermined calculation on a communication fee and output means for outputting a result of the calculation as report.

4. The image communication apparatus according to claim 3, further comprising input means for inputting a calculation equation used in said calculation means.

5. The image communication apparatus according to claim 1, further comprising storage means for storing a result of discrimination by said recognition means.

6. An image communication apparatus comprising:

means for receiving facsimile transmission data;

recognition means for recognizing, at the least, a password for accessing a database, retrieval information for retrieving a desired database, and destination information for specifying a destination facsimile for retrieved image data, from a received facsimile image;

retrieval means for performing retrieval in accordance with said retrieval information and said password; and facsimile transmission means for transmitting retrieved data to said destination facsimile according to said destination information, wherein said facsimile image can include request information for sending the result of the execution of a retrieval to a calling facsimile.

7. A method for retrieving data from a database through an image communication apparatus, comprising the steps of:

receiving a facsimile image from a destination facsimile;

recognizing, at the least, a password for accessing a database, retrieval information for retrieving a desired database, and destination information for specifying the destination facsimile for retrieved data, from the received facsimile image;

performing retrieval in accordance with said retrieval information and said password;

transmitting retrieved data to the destination facsimile according to said destination information;

generating a report of a result of the retrieval;

combining the report generated by said report generating means and the received facsimile image; and transmitting the combined information to the destination facsimile.

8. A method of retrieving data from a database through an image communication apparatus, comprising the steps of:

receiving a facsimile image from a destination facsimile;

recognizing, at the least, a password for accessing a database, retrieval information for retrieving a desired database, destination information for specifying the destination facsimile for retrieved data, and request information representing whether a report of a result of a retrieval should be sent to the destination facsimile, from the received facsimile image;

performing retrieval in accordance with said retrieval information and said password;

transmitting retrieved data to the destination facsimile according to said destination information; and transmitting a report of the result of the retrieval to the destination facsimile when the request information indicates that the report is to be to the destination facsimile.

* * * * *